3,792,113
THERMOPLASTIC POLYMERS CONTAINING POST CHLORINATED VINYL HALIDE-BIS(HYDROCARBYL) VINYL PHOSPHONATE COPOLYMERS
Jagadish C. Goswami, New York, and Jung Il Jin, Irvington, N.Y., assignors to Stauffer Chemical Company, Westport, Conn.
No Drawing. Original application Dec. 23, 1970, Ser. No. 101,194, now Patent No. 3,725,359. Divided and this application Sept. 21, 1972, Ser. No. 290,940
Int. Cl. C08f 27/03; C08g 41/04
U.S. Cl. 260—857 UN        13 Claims

ABSTRACT OF THE DISCLOSURE

There are disclosed post-chlorinated copolymers of: (1) one or more vinyl halides; (2) one or more bis(hydrocarbyl) vinylphosphonates; and (3) as an optional component one or more ethylenically unsaturated monomers. These post-chlorinated products have a higher glass transition temperature than the copolymers from which they are derived and are, therefore, of greater utility in many applications such, for example, as in the preparation of polyblends with burning thermoplastics wherein they impart a significant degree of flame retardance without causing substantial reduction in the heat distortion temperature of the resulting polyblends.

BACKGROUND OF THE INVENTION

This is a division of application Ser. No. 101,194, filed December 23, 1970, now Pat. No. 3,725,359.

As is known to those skilled in the art, the copolymers of the bis(hydrocarbyl) vinylphosphonates, and particularly the copolymers of bis(beta-chloroethyl) vinylphosphonate with vinyl halides such as vinyl chloride, display excellent fire retardancy properties resulting from the presence, therein, of high concentrations of phosphorus and chlorine. These properties have led to the use of these copolymers as fire retardancy additives for various substrates such, for example, as for the so-called burning thermoplastics which include, for example, polystyrene, the polyolefins, polymethyl methacrylate and the ABS resins; these thermoplastics having the property, upon being ignited, of continuing to burn until substantially consumed.

As might be expected, the blends of these vinyl halide:bis(hydrocarbyl) vinylphosphonate copolymers with burning thermo plastics, which are usually referred to as polyblends, exhibit excellent flame retarding properties. However, their usefulness is somewhat limited because of the reduction in their $T_g$, i.e. in their glass transition temperature, which results from the inherently low $T_g$ of the flame retardant copolymer additives utilized in their preparation. Thus, the glass transition temperature of a resin or polymer is the temperature at which it undergoes a reversible change characterized by a rather sudden transition from a hard, glassy or brittle condition to a flexible or elastomeric condition. Other properties of a polymer, including its coefficient of thermal expansion, specific heat and density also usually undergo changes at the same time that this transition occurs since the molecular chains of the polymer, which are normally coiled, tangled and motionless at temperature below the $T_g$, become free to rotate and slip past each other.

Thus, as a result of the inherently low $T_g$ of the vinyl halide:vinylphosphonate copolymers, certain of the properties of their polyblends with burning thermoplastics are deficient. This is particularly evident with respect to the heat distortion temperature of these blends. This property, which is also often referred to as the deflection temperature under load, i.e. the DTL, or the tensile heat distortion temperature, is the temperature at which a standard test bar of the polymer, where specifications are defined in ASTM D648, deflects 0.010 inch under a stated load of either 66 or 264 p.s.i. Needless to say, a polymer having a low heat distortion temperature will be inoperative in many applications which require its exposure to high temperatures. Therefore, although polyblends of burning thermoplastics with vinyl halide:vinylphosphonate copolymers display excellent flame retardant characteristics, their low heat distortion temperatures preclude their use in certain situations wherein they would otherwise meet the standards set by various building codes or where they could safely be employed in place of more costly materials.

It is, therefore, the prime object of this invention to provide a means for increasing the inherently low $T_g$ of vinyl halide:bis(hydrocarbyl) vinylphosphonate copolymers. It is a further object of this invention to utilize the thus improved copolymers in the preparation of polyblends with burning thermoplastics characterized by their excellent fire retardant properties which are achieved without any serious diminution of the physical properties of such blends and particularly their heat distortion temperatures. Various other objects and advantages of this invention will be apparent from the disclosure thereof which follows hereinafter.

TECHNICAL DISCLOSURE OF THE INVENTION

It has now been discovered that the inherently low $T_g$ of vinyl halide:bis(hydrocarbyl) vinylphosphonate copolymers can, surprisingly, be increased by means of a post-chlorination procedure, i.e. a procedure in which the previously prepared copolymer is chlorinated. Thus, the resulting post-chlorinated copolymers are found to have undergone an unexpected and rather substantial increase in their $T_g$ which now makes it possible to utilize them in the preparation of fire retardant polyblends with various burning thermoplastics which are characterized by the fact that they have not undergone any detrimental effects upon their physical properties, particularly their heat distortion temperatures. Moreover, it is also truly surprising and advantageous to find that the post-chlorinated copolymers resulting from the process of this invention display an outstanding degree of compatibility and are, therefore, readily blended with a wide variety of burning thermoplastics since, as is well known to those skilled in the art, physical blends of two or more polymers are almost always characterized by a substantial degree of incompatibility.

In greater detail, now, the vinyl halide:bis(hydrocarbyl) vinylphosphonate copolymers which can be post-chlorinated by means of the process of this invention may be said to comprise copolymers of:

(1) One or more vinyl halides selected from the group consisting of vinyl chloride, vinyl bromide and vinyl fluoride. From the latter group, the use of vinyl chloride is preferred because of its lower cost and greater commercial availability; and, (2) One or more bis(hydrocarbyl) vinylphosphonates having the structure:

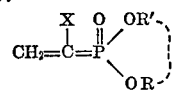

wherein X is selected from the group consisting of hydrogen, halogen, cyano, aryl such as phenyl, haloaryl $C_1$-$C_{18}$ alkyl, $C_1$-$C_{18}$ haloalkyl and

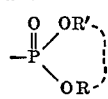

wherein R and R' are hydrocarbyl and substituted hydrocarbyl groups consisting essentially of hydrogen and carbon and containing up to about 18 carbon atoms inclusive with the proviso that R and R' may be the same, different or conjoint, i.e. R and R' may form one single radical.

The use, in this disclosure, of the expression "hydrocarbyl" and "substituted hydrocarbyl groups" refers to the radicals obtained upon the removal of a hydrogen from a hydrocarbon or substituted hydrocarbon group which may be either an aliphatic or aromatic group. These hydrocarbyl groups may be substituted with any non-interfering groups, i.e. with any group which does not interfere with the polymerization of the bis(hydrocarbyl)vinylphosphonate. Such substituent groups include, for example, chloro, bromo, fluoro, nitro, hydroxy, sulfone, ethoxy, methoxy, nitrile, ether, ester and keto groups and the like.

Illustrative of such aliphatic groups as are represented by R and R' are alkyl groups, such as methyl, ethyl, propyl, butyl, pentyl, hexyl, nonyl, pentenyl and hexenyl groups and all of their respective isomers; cycloalkyl groups, such as cyclopropyl, cyclobutyl, cyclopentyl, cyclohexyl and cyclohexenyl groups and the like; while typical aryl groups represented by R and R' include phenyl, benzyl, phenethyl, tolyl and naphthyl groups and the like.

Representative of the above depicted bis(hydrocarbyl) vinylphosphonates are:

Bis(beta-chloroethyl) vinylphosphonate;
Bis(beta-chloropropyl) vinylphosphonate;
Bis(beta-chloroethyl) 1-methylvinylphosphonate;
Bis(beta-chloroethyl) 1-cyanovinylphosphonate;
Bis(beta-chloroethyl) 1-chlorovinylphosphonate;
Bis(beta-chloroethyl) 1-phenylvinylphosphonate;
Dimethyl vinylphosphonate;
Diethyl vinylphosphonate;
Bis(omega-chlorobutyl) vinylphosphonate;
Di-n-butyl vinylphosphonate;
Di-isobutyl vinylphosphonate;
Bis(2-chloroisopropyl) 1-methylvinylphosphonate;
Di-n-propyl vinylphosphonate;
Di-isopropyl vinylphosphonate;
Diphenyl vinylphosphonate; and,
Bis(2,3-dibromopropyl) vinylphosphonate.

From the above group of bis(hydrocarbyl) vinylphosphonate monomers, it is preferred to employ bis(beta-chloroethyl) vinylphosphonate in preparing the copolymers utilized in the post-chlorination process of this invention since the latter monomer is a commercially available material and lower in cost than any of the other bis(hydrocarbyl) vinylphosphonates. It is to be noted, at this point, that the use of the term "copolymer" in this disclosure is meant to apply to polymers derived from two, three or more distinct monomer species.

In addition to the above described bis(hydrocarbyl) vinylphosphonates, it is also possible to prepare copolymers useful in the post-chlorination process of this invention by employing: (1) mono(alkyl) acid vinylphosphonates such, for example, as mono(ethyl) hydrogen vinylphosphonate, mono(butyl) hydrogen vinylphosphonate, mono(octyl) hydrogen vinylphosphonate, mono(betachloroethyl) hydrogen vinylphosphonate, mono(omegachlorooctyl) hydrogen vinylphosphonate; (2) mono(cycloalkyl) and mono(aryl) hydrogen vinylphosphonates such, for example, as mono(cyclohexyl) hydrogen vinylphosphonate, mono(phenyl) hydrogen vinylphosphonate, mono(benzyl) hydrogen vinylphosphonate; (3) bis(cycloalkyl) and bis(aryl) vinylphosphonates such, for example, as bis(cyclohexyl) vinylphosphonate and bis(benzyl) vinylphosphonates; and (4) bis(alkyl), bis(cycloalkyl), and bis(aryl) allylphosphonates such, for example, as bis (betachloroethyl) allylphosphonate, bis(cyclohexyl) allylphosphonate and bis(benzyl) allylphosphonate as well as mixtures of any two or more of the above described phosphonate monomers.

The copolymers applicable for use in the post-chlorination process of this invention may also, if desired, contain one or more optional vinyl comonomers, i.e. one or more ethylenically unsaturated monomers, including vinylidene halides such as vinylidene chloride, vinylidene bromide and vinylidene fluoride; alpha-olefins such as ethylene, propylene and butylene; vinyl esters of carboxylic acids such as vinyl acetate, vinyl butyrate, and vinyl stearate; and $C_1$–$C_{20}$ alkyl esters of acrylic and methacrylic acid such as methyl methacrylate, methyl acrylate, ethyl acrylate, butyl acrylate, 2-ethylhexyl acrylate and lauryl acrylate; aryl, halo- and nitro-substituted benzyl esters of acrylic and methacrylic acid such as benzyl acrylate and 2-chlorobenzyl acrylate; ethylenically unsaturated monocarboxylicacids such as acrylic and methacrylic acids; ethylenically unsaturated dicarboxylic acids, their anhydrides and their $C_1$–$C_{20}$ mono- and dialkyl esters such as aconitic acid, fumaric acid, maleic acid, itaconic acid, citraconic acid, maleic anhydride, dibutyl fumarate and monoethyl maleate; amides of ethylenically unsaturated carboxylic acids such as acrylamide and methacrylamide; vinyl pyrrolidones such as N-vinyl-2-pyrrolidone; vinyl aryl compounds such as styrene and alpha-methyl styrene; nitriles of ethylenically unsaturated carboxylic acids such as acrylonitrile and methacrylonitrile; and, $C_1$–$C_{20}$ alkyl vinyl ethers such as methyl vinyl ether, ethyl vinyl ether and stearyl vinyl ether. Preferred for use as optional comonomers are the vinylidene halides, particularly vinylidene chloride; the vinyl aryl compounds particularly styrene; and, the lower alkyl esters of acrylic and methacrylic acids.

With respect to proportions, the vinyl halide:vinylphosphonate copolymers applicable for use in the post-chlorination process of this invention may contain from about 5 to 95%, by weight, of one or more of the above described bis(hydrocarbyl) vinylphosphonates, from about 5 to 95%, by weight, of one or more of the above described vinyl halides and from 0 to about 50%, by weight, of one or more of the above described optional vinyl comonomers.

The above described copolymers may be prepared by means of any convenient free radical initiated polymerization technique known to those skilled in the art including such procedures as suspension, emulsion and solution polymerization.

Thus in preparing these vinyl halide:vinylphosphonate copolymers by means of a suspension polymerization technique, the reaction is conducted in an aqueous medium containing from about 0.1 to 5.0%, as based on the total weight of the monomer mixture, of a suspension agent such, for example as gelatin, starch, hydroxymethyl celluose, hydroxyethyl celluose, hydroxypropyl cellulose, carboxymethyl cellulose, talc, clay, polyvinyl alcohol and the like. As a catalyst for the polymerization, one may use from about 0.01 to 5.0%, as based on the total weight of the monomer mixture, of a monomer soluble azo or peroxide catalyst such, for example, as azobisisobutyronitrile, lauroyl peroxide, benzoyl peroxide, isopropylperoxy dicarbonate, t-butyl peroxypivalate and the like.

Polymerization may ordinarily be initiated by heating the system to a temperature in the range of from about 20 to 120° C. for a period of from about 5 to 48 hours with agitation being applied throughout the course of the reaction. The resulting product will comprise an aqueous suspension of the desired copolymers which will be in the form of particulate solids having a resin solids content in the range of from about 5 to 50%, by weight. These copolymer particles will have a particle size in the range of from about 10 to 1,000 microns with a range of from about 50 to 500 microns being preferred when these copolymers are to be used in the post-chlorination process of this invention.

In preparing these copolymers by means of an emulsion polymerization procedure, the selected monomers are dispersed in an aqueous medium containing from about 0.01 to 5.0%, by weight of the monomers, of one or more anionic, non-ionic or cationic emulsifiers such, for example, as the alkyl carboxylic acid salts, the alkyl sulfate salts, the alkyl sulfonate salts, the alkyl phosphate salts, the alkyl sulfosuccinate salts, the alkyl aryl ether alcohols and the alkyl aryl polyether sulfate salts. The aqueous monomer emulsion is then heated for about 5 to 48 hours at a temperature of from about 20 to 120° C. in the presence of from about 0.01 to 5.0%, by weight of the monomer mixture, of a water soluble free radical initiating catalyst such, for example, as ammonium, sodium or potassium persulfate, hydrogen peroxide or a redox system comprising a mixture of a persulfate with an alkali metal bisulfite, thiosulfate or hydrosulfite.

And, in preparing these copolymers by means of a solution polymerization procedure, the selected monomers are first dissolved in an organic solvent such, for example, as benzene, toluene, cyclohexanone, acetone, tetrahydofuran, trichloroethylene, dimethylformamide or dimethylsulfoxide. The resulting solution is then heated for from about 5 to 48 hours at a temperature of from about 20 to 120° C. in the presence of a monomer soluble azo or peroxide catalyst as exemplified by the compounds listed, hereinabove, in describing the suspension polymerization process.

As ordinarily prepared by means of the above described polymerization procedures, these vinyl halide:bis(hydrocarbyl) vinylphosphonate copolymers have a $T_g$ in the range from about −20 to 100° C. And, it is to be noted, that it is preferred to employ copolymers which have been prepared by means of a suspension polymerization process in conducting the post-chlorination process of this invention since such procedures are simple and economical and produce a polymer having a proper particle size for the subsequent post-chlorination reaction as well as for its convenient recovery from the polymerization reaction system.

Specific copolymer compositions which have been found to provide particularly good results upon being post-chlorinated in the process of this invention are copolymers of vinyl chloride and bis(betachloroethyl) vinylphophonate having monomer ratios, by weight, of 80:20, 75:25, 70:30, 60:40 and 50:50.

The post-chlorination treatment of the above described copolymers is, preferably, carried out in the presence of ultraviolet radiation using gaseous chlorine as the chlorinating agent. Thus, the selected copolymer will ordinarily be dispersed in water so as to form a slurry having a concentration of from about 5 to 50%, by weight, of copolymer solids. The system should also contain from about 10 to 400%, by weight of copolymer solids, of concentrated hydrochloride acid and from about 5 to 50%, by weight, of copolymers solids of a swelling agent for the polymer. These swelling agents are chlorinated hydrocarbons such, for example, as carbon tetrachloride, chlorobenzene and, preferably, chloroform. Other swelling agents for the polymer such, for example, as dimethyl sulfoxide can also be used if desired. The reaction vessel containing the polymer slurry is then positioned close enough to a source of ultraviolet radiation so as to produce a reaction temperature of from about 0 to 100° C. and preferably from about 40 to 65° C. For example, when employing a 400 watt mercury vapor lamp, the reactor should be about 7~9 inches from the radiation source.

While under vigorous agitation, the reaction vessel should be purged with nitrogen gas for about 15 minutes whereupon chlorine gas is introduced until, after a period of from about 5 to 20 minutes, it is noted that the copolymer slurry has become greenish-yellow color in color. At this point, the flow rate of the chlorine should be adjusted so as to be within the range of from about 0.5 to 20, and preferably at about 3, cubic centimeters per minute per gram of copolymer solids whereupon the ultraviolet radiation source is turned on. The reaction is then allowed to proceed until the chlorine content of the copolymer has been increased by from about 2 to 50%, and preferably by from about 10 to 40%, by weight, so that the resulting product now has a chlorine content in the range of from about 35–75%, by weight. This ordinarily requires a reaction period of from about 1 to 8 hours. The resulting post-chlorinated copolymer should then be treated with a dilute aqueous alkaline solution such, for example, as a solution of sodium bicarbonate, sodium carbonate or sodium hydroxide so as to neutralize the excess hydrochloric acid. It should then be filtered, washed several times with water and then with a lower alkanol, such as methanol, whereupon it may be dried by any convenient means such, for example, as by the use of a vacuum oven.

In addition to the above described chlorination procedure, the post-chlorination process of this invention may be carried out using any desired chlorination process which is capable of increasing the overall chlorine concentration of the vinyl halide:vinylphosphonate copolymer by from about 2 to 50%, by weight, so as to provide it with a final chlorine content from about 35 to 75%, by weight. Thus, other applicable chlorination procedures include procedures in which organic compounds which, on being heated, generate free radicals are used in place of an ultraviolet radiation source. Suitable free radical initiators are peroxide and azo compounds such, for example, as benzoyl peroxide, lauroyl peroxide, acyl persulfonate, isopropylpercarbonate, t-butyl peroxypivalate, azobisisobutyronitrile, azomethane, azobis($\alpha,\gamma$-dimethylvaleronitrile) and the so-called redox catalyst systems.

As a result of the above described post-chlorination treatment, the $T_g$ of the vinyl halide:vinylphosphonate copolymers will have been increased by from about 5 to 80° C. and, preferably by about 10 to 50° C. so that the post-chlorinated copolymer will have a $T_g$ of from about −10 to 150° C. The thus modified copolymers can now be used to prepare polyblends with burning thermoplastics which are characterized by their outstanding fire retardancy and their ease of blending. And, of great significance, is the fact that these blends do not have any serious deficiencies in their physical properties, and particularly, in their heat distortion temperatures, when compared with the particular unmodified, burning thermoplastic which is used in their preparation.

As used in this disclosure, the term "fire retardant" or "flame retardant" is intended to refer to that particular property of a material which provides it with a degree of resistance to ignition and burning. Thus, a fire or flame retardant composition is one which has a low level of flammability and flame spread. This property may be conveniently evaluated by means of any of the standard flame retardancy tests such, for example, as the ASTM test D–635. In brief, this test involves preparing 5″ x ½″ x 0.05″ specimens from sheets of the polymer undergoing evaluation. These specimens are then suspended so that their 5″ dimension is horizontal and their ½″ dimension is inclined at a 45° angle. One end of the suspended specimen is then contacted, for 30 second periods, with a one inch high flame from a ⅜″ diameter barrel Bunsen burner fitted with a 1⅞″ wide wing top.

The thermoplastic polymers which can be used in preparing polyblends with the novel post-chlorinated copolymers of this invention include:

(1) Polymers of vinyl chloride including polyvinyl chloride and the random and graft copolymers of vinyl chloride with a minor proportion of one or more of the above described group of vinyl comonomers which were listed as optional comonomers for use in preparing the vinyl halide-vinylphosphonate copolymers.

(2) Polymers of nitriles of ethylenically unsaturated acids including polymethacrylonitrile, polyacrylonitrile and the copolymers of methacrylonitrile or acrylonitrile, and a minor proportion of one or more vinyl monomers such as the lower alkyl acrylates and methacrylates, styrene and alpha-methyl styrene.

(3) Polymers of methyl methacrylate including polymethyl methacrylate and the copolymers of methyl methacrylate with minor proportions of one or more alpha, beta-ethylenically unsaturated monomers which are polymerizable therewith including the $C_1$–$C_8$ alkyl, cycloalkyl and bicycloalkyl esters of acrylic acid and the $C_2$–$C_8$ alkyl, cycloalkyl and bicycloalkyl esters of methacrylic acid such, for example, as ethyl acrylate and methacrylate, butyl methacrylate, 2-ethylhexyl methacrylate, norbornyl acrylate, and cyclohexyl acrylate; vinyl aryl compounds such, for example, as alpha-methyl styrene and styrene; and, nitriles of alpha, beta-ethylenically unsaturated carboxylic acids such, for example, as acrylonitrile and methacrylonitrile. From the above given group, the use of the $C_1$–$C_8$ alkyl esters of acrylic acid, particularly ethyl acrylate, and of the $C_2$–$C_8$ alkyl esters of methacrylic acid is preferred.

(4) Acrylonitrile-butadiene-styrene resins, commonly referred to as "ABS" resins, which generally comprise either a mixture of a 60 to 80:40 to 20 styrene:acrylonitrile copolymer with from about 10 to 40%, by weight, of a 5 to 40:95 to 60 acrylonitrile-butadiene copolymer or a mixture of a 60 to 80:40 to 20 styrene:acrylonitrile copolymer with from about 10 to 40%, by weight, of a graft of the latter copolymer onto polybutadiene.

(5) Poly(alpha-olefins) such as polypropylene and polyethylene and copolymers of one or more alpha-olefins, such as ethylene or propylene, with a minor proportion of one or more ethylenically unsaturated monomers including 4-methyl pentene-1, butene-1, norbornene and its derivatives; cyclopentadiene; cyclopentene; cyclobutene; vinyl acetate; the $C_1$–$C_{12}$ alkyl acrylate and methacrylate esters; as well as blends of the homo- and copolymers of alpha-olefins with other types of thermoplastic polymers.

(6) Polymers of styrene including polystyrene, poly(alpha-methyl styrene) and poly(tertiary butyl styrene) and copolymers of styrene-alpha methyl styrene or tertiary butyl styrene with a minor proportion of one or more ethylenically unsaturated comonomers such, for example, as nitriles of ethylenically unsaturated carboxylic acids including acrylonitrile and methacrylonitrile; $C_1$–$C_{12}$ alkyl esters of acrylic and methacrylic acids such, for example, as methyl methacrylate and 2-ethylhexyl acrylate; and, graft copolymers of styrene, tertiary butyl styrene or alpha-methyl styrene with polybutadiene and other hydrocarbon elastomers.

(7) Cellulosic resins including cellulose esters and mixed esters such, for example, as cellulose nitrate, cellulose acetate, cellulose butyrate, cellulose propionate, cellulose acetate-butyrate, cellulose acetate-propionate and cellulose ethers such, for example, as ethyl cellulose.

(8) Polyamide resins, i.e. the resins made by the condensation of di- or polyamines with di- or polybasic acids or by polymerization of lactams or amino acids. Typical polyamides include nylon 4 which is made from pyrrolidone; nylon 6 obtained by polycondensation of caprolactam; nylon 66 obtained by the condensation of hexamethylene diamine with adipic acid; nylon 610 obtained by the condensation of hexamethylenediamine with sebacic acid; nylon 7 which is a polymer of ethyl aminoheptanoate; nylon 9 made from 9-aminononanoic acid; and nylon 11 made from 11-amino undecanoic acid;

(9) Polyester resins, i.e. the resins produced by the condensation of saturated or unsaturated dibasic acids, such as terephthalic, maleic, fumaric, isophthalic, adipic and azelaic acids with dihydric alcohols such as ethylene glycol, propylene glycol, diethylene glycol and dipropylene glycol. Where the resin is made within unsaturated acid, a polymerizable monomer such, for example, as styrene, vinyl toluene, diallyl phthalate, methyl methacrylate; chlorostyrene, alpha-methyl styrene, divinyl benzene or triallyl cyanurate is often included in the composition;

(10) Polyurethane resins, i.e. the resins formed by the reaction between a bi- or polyfunctional hydroxyl containing compound, such as a polyether or polyester, and a di- or polyisocyanate such as toluene diisocyanate or diphenylmethane-4,4'-diisocyanate;

(11) Polycarbonate resins, i.e. the resins derived from the reaction between a difunctional alcohol or phenol, such as bisphenol A, and phosgene or an alkyl or aryl carbonate;

(12) Polyacetal resins, i.e. the resins derived from the anionic polymerization of formaldehyde to obtain a linear molecule of the type —O—$CH_2$—O—$CH_2$—O—$CH_2$—;

(13) Polyphenylene oxide resins made by the oxidative polymerization of 2,6-dimethylphenol in the presence of a copperamine-complex catalyst;

(14) Polysulfone resins, i.e. the resins containing an $SO_2$ linkage as derived from the reaction of sulfur dioxide with olefins such as 1-butene or, more preferably, by reaction of bisphenol A with 4,4'-dichlorodiphenyl sulfone.

(15) The acrylate:styrene:acrylonitrile resins, commonly referred to as "ASA" resins, which comprise copolymers containing a major proportion of a $C_2$–$C_8$ alkyl acrylate ester elastomer upon which is grafted about 65–95%, by weight of the latter copolymer, of a 70–80:30–20 styrene:acrylonitrile copolymer.

(16) The methacrylate:butadiene:styrene resins, commonly referred to as the "MBS" resins, which comprise a minor proportion of a methyl methacrylate:styrene: acrylonirtile terpolymer grafted and/or blended with either polybutadiene or a copolymer of butadiene and minor proportions of such comonomers as, for example, styrene and acrylonitrile.

In effect, one may utilize any thermoplastic ploymer, i.e. any polymer that may be softened by heat and then regain its original properties on cooling, in preparing polyblends with the novel post-chlorinated copolymers of this invention.

The actual blending of the post-chlorinated copolymer additives of this invention with the seelcted polymeric substrate, i.e. with any one or more of the above described thermoplastic polymers, may be accomplished by means of any convenient procedure which will result in an intimate admixture of the additive within the mass of the substrate polymer. Thus, for example, an aqueous suspension containing the particles of the copolymer additive may simply be blended or otherwise admixed with the substrate polymer which should, preferably, be in the form of an aqueous latex or suspension. Or, if desired, the copolymer additive and the thermoplastic polymer substrate may be admixed while each is in the form of a solid powder.

The blending operation may also be carried out by means of a procedure in which the thermoplastic polymer which comprises the substrate is itself polymerized while in the presence of an aqueous emulsion or suspension or organic solvent solution containing one or more of the previously prepared post-chlorinated copolymer additive of this invention.

With respect to proportions, the amount of post-chlorinated vinyl halide:bis(hydrocarbyl) vinylphosphonate copolymer which may be admixed with a thermoplastic polymer substrate will depend, primarily, upon such factors as the particular post-chlorinated copolymer and thermoplastic polymer substrate which are to be blended with one another, the degree of fire retardancy desired in the resulting blend, the degree of clarity, hardness and other specific physical properties which are sought as well as other technical and economical considerations known and understood by those skilled in the art. However, in order to attain a composition which will be self-extinguishing, it is generally desirable to introduce an effective concentration of the copolymer additives which will be sufficient to provide the resulting blend with at least about 0.5%, by weight, of phosphorus. Thus, depending upon the concentration of the vinylphosphonate in the post-chlorinated copolymer, the polyblends containing the novel additives of this invention will contain from about 5 to 50%, by weight, of one or more of these post-chlorinated copolymers.

The fire retardant polyblends of this invention can be prepared so as to contain various optional additives which may include plasticizers such as the alkyl esters of phthalic, adipic and sebacic acids such, for example, as dioctyl phthalate and ditridecyl phthalate and aryl phosphate esters such, for example, as diphenyl 2-ethylhexyl and tricresyl phosphate, etc.; lubricants and mold release agents such as stearic acid or its metal salts, petroleum based waxes, mineral oils, polyethylene waxes, etc.; and heat and light stabilizers such as barium, cadmium, calcium, zinc soaps and phenates, basic lead compounds, organotin compounds, such as dialkyl tin mercaptides and dialkyl tin maleates, thiolauric anhydride and n-butyl stannoic acid, epoxidized oils, alkyl diphenyl phosphites, triaryl phosphites, phenyl salicylates, benzophenones and benzothiazoles, etc. For a more complete listing of plasticizers, lubricants, stabilizers and other functional additives, one may consult "Polyvinyl Chloride" by H. A. Sarvetnick published by Van Nostran Reinhold Co., New York, N.Y., in 1969.

These polyblends may also contain fillers, pigments, dyes, opacifying agents, decorative additives such as reflective metal foils or flakes, and other imbedded solid objects such as fiber glass, textile, fibers, asbestos, paper, and the like, provided that they do not detract from the flame retardancy of these products. In addition, the compositions may contain other flame retardants such as antimony compounds, chlorinated paraffins, perchlorinated alicyclic compounds, bromine containing organic compounds, halogenated alkyl phosphates or phosphonates, alkyl acid phosphates, or small concentrations of phosphoric acid.

The novel polyblends of this invention, comprising blends of any of the above described thermoplastic polymers with one or more of the post-chlorinated copolymer additives of this invention, may be utilized in any of the coating, impregnating and especially in the molding applications known to those skilled in the art wherein it is desired to provide fire retardancy to the resulting end product. For example, these compositions may be used for preparing such diverse items as calendered films, blow molded bottles, extruded and blown films, extruded and shaped articles such as panels, tubes, sheets, rods, fibers and particularly in polypropylene and other polyolefin fibers, and in carrying out such processes as injection molding, fluidized bed coating, electrostatic powder spraying and rotational coatings, etc. More particularly, those polyblends which are optically clear such, for example, as those based upon homo- or copolymers of methyl methacrylate or homo- or copolymers of styrene may be utilized for preparing such articles as lenses, aircraft canopies, windows, windshields, lighting fixtures and advertising displays. Applications wherein optical clarity is not essential include such automotive applications as seat backs, door panels, instrument panels, head rests, arm rests, package shelves, plated hardware, radiator grills, fender extensions and liners, wheel covers and gas tanks. Non-automotive applications include their use as structural and decorative components for both the interiors and exteriors of conventional houses and mobile homes and as structural decorative elements of business machines and electrical appliances.

In addition to being used as fire retardant additives for the preparation of polyblends, the post-chlorinated copolymers of this invention may be used in any of the various coating, adhesive, laminating, impregnating and molding applications known to those skilled in the art. Thus, they may be coated upon and/or absorbed by all types of substrates to which it is desired to impart fire retardant properties. They may, therefore, be used as coatings, impregnants, fillers, laminants, and adhesives for such substrates as wood; paper; metals; textiles based on either natural or synthetic fibers or blends thereof; synthetic polymer films such as those based upon polyolefins, regenerated cellulose, i.e. cellophane, polyvinyl chloride, polyester and the like; leather; natural and synthetic rubber; fiberboard; and, synthetic plastics prepared by means of either addition or condensation polymerization techniques.

The following examples will further illustrate the embodiment of this invention. In these examples, all parts given are by weight unless otherwise noted.

EXAMPLE 1

This example illustrates the preparation of a post-chlorinated vinyl halide:bis(hydrocarbyl) vinylphosphonate copolymer by means of the process of this invention.

Into a 2-liter resin kettle reactor fitted with a stirrer, condenser, a sintered-glass dip tube for the introduction of chlorine gas and a thermometer, are charged the following materials:

| | |
|---|---|
| An 80:20 vinyl chloride:bis(beta-chloroethyl)vinylphosphonate cooplymer in the form of beads having a particle size of about 300 microns _____g__ | 200 |
| Distilled water _____ml__ | 350 |
| Conc. HCl (37%) _____ml__ | 400 |
| $CHCl_3$ _____ml__ | 75 |

The thus charged reactor is position 7″ from a 400-watt mercury vapor lamp so as to be able to produce a reaction temperature of 60~65° C.

The copolymer slurry is vigorously agitated and $N_2$ gas is then bubbled through the slurry for about 15 minutes followed by the passage of the chlorine gas for another 15 minutes after which time a greenish-yellow color has been imparted to the slurry. At this stage the chlorine flow rate is adjusted to a rate of 3 cc./min./g. of copolymer whereupon the ultraviolet light source is turned on thereby heating the system to the desired reaction temperature of 60~65° C.

After 4 hours of exposure time, the chlorinated product is treated with a 5% aqueous $NaHCO_3$ solution for a period of approximately one hour so as to neutralize the excess acid. It is then filtered, washed several times with water and then with methanol whereupon it is dried in a vacuum oven at 60° C., for 20 hours. This procedure provides a yield of 280 g. of the chlorinated copolymer. The analysis of this product as well as of the unchlorinated copolymer used in its preparation is given in the following table.

| Property | Unchlorinated copolymer | Chlorinated copolymer |
|---|---|---|
| Percent Cl | 50.6 | 65.1 |
| Percent P | 2.73 | 1.93 |
| $T_g$ (° C.) | 76 | 110 |

The above given data illustrate the substantial increase in $T_g$ which is obtained in the post-chlorinated copolymers of this invention in comparison with the original, unmodified copolymers from which they are derived.

EXAMPLE II

This example illustrates the use of the post-chlorinated copolymers of this invention in the preparation of fire retardant polyblends with various burning thermoplastics.

The polyblends described in the following table are prepared by physically mixing their respective components followed by pressing the resulting mixtures in a laboratory press at approximately 330° F. under a pressure of 40,000 p.s.i. for a period of from about 0.5 to about 2 minutes.

As shown in the table, the resulting blends display reduced flammability upon having their limiting oxygen index (LOI) determined by means of ASTM D-2863; the latter procedure also being described by Fenimore and Martin in the November 1966, issue of Modern Plastics. In brief, the LOI directly relates flame retardancy to a measurement of the minimum percentage concentration of oxygen in a oxygen:nitrogen mixture which permits the sample to burn; the LOI being calculated as follows:

$$LOI = \frac{[O_2]}{[O_2]+[N_2]} \times 100$$

Thus, a higher LOI is indicative of a higher degree of flame retardancy.

| Thermoplastic polymer substrate | Polyblend | LOI[1] |
|---|---|---|
| An ABS resin[2] | (i) 100% ABS | 17.4 |
| | (ii) 70% ABS plus 30% C—VC/BB[3] | 21.4 |
| | (iii) 50% ABS plus 50% C—VC/BB | 25.1 |
| Polystyrene | (i) 100% polystyrene | 18.2 |
| | (ii) 70% polystyrene plus 30% C—VC/BB | 21.6 |
| | (iii) 50% polystyrene plus 50% C—VC/BB | 24.0 |
| Polymethyl methacrylate (PMMA) | (i) 100% PMMA | 17.3 |
| | (ii) 70% PMMA plus 30% C—VC/BB | 21.6 |
| | (iii) 50% PMMA plus 50% C—VC/BB | 26.9 |

[1] Determined by ASTM D-2863.
[2] "Blendex 311" sold by the Marbon Chemical Division of the Borg-Warner Corp.
[3] C—VC/BB=The post-chlorinated vinyl chloride:bis(beta-chloroethyl) vinylphosphonate copolymer whose preparation is described in Example 1, hereinabove.

Comparable results are obtained upon blending this same post-chlorinated copolymer additive with other burning thermoplastics including polyethylene, polypropylene, polyurethane and polyvinyl chloride resins.

Moreover, excellent fire retardant polyblends are also provided by the use of the following post chlorinated copolymers:

(1) A post-chlorinated 70:30 vinyl chloride:bis(beta-chloroethyl) 1-cyanovinylphosphonate copolymer containing 48% of Cl and 3.5% of P;

(2) A post-chlorinated 80:20 vinyl bromide:bis(beta-chloropropyl) vinylphosphonate copolymer containing 60% of Bn and 2.5% of P;

(3) A post-chlorinated 40:20:40 vinyl chloride:ethyl acrylate:bis(beta-chloroethyl) 1-phenylvinylphosphonate copolymer containing 32% of Cl and 4% of P;

(4) A post-chlorinated 60:40 vinyl chloride:di-n-butyl vinylphosphonate copolymer containing 34% of Cl and 5.6% of P; and, (5) A post-chlorinated 70:30 vinyl chloride:di-phenyl vinylphosphonate copolymer containing 40% of Cl and 3.6% of P.

EXAMPLE III

This example illustrates the preparation of another of the post-chlorinated copolymers of this invention as well as its use in the preparation of polyblends with various burning thermoplastics.

Following the procedure described in Example 1, hereinabove, 200 grams of a 75:25 vinyl chloride:bis(beta-chloroethyl) vinylphosphonate copolymer is chlorinated under the following reaction conditions:

Chlorine flow rate=3 cc./min./g. of copolymer
Reaction temperature=60~65° C.
Reaction time=5 hrs.
Yield=300 g.

The analysis of this product, as well as of the unchlorinated copolymer used in its preparation, is given hereinbelow:

| | Percent |
|---|---|
| Chlorine content of the unchlorinated copolymer | 50 |
| Chlorine content of the chlorinated copolymer | 67.4 |
| Phosphorus content of the unchlorinated copolymer | 3.3 |
| Phosphorus content of the chlorinated copolymer | 2.3 |

Polyblends are then prepared from the above described post-chlorinated copolymer as well as from the copolymer used in its preparation by blending each, respectively, with an equal portion of polymethyl methacrylate and an ABS resin sold as "Lustran 461" by the Monsanto Co. Each of these blends also contains 3%, by the weight of the post-chlorinated copolymer, of an organotin stabilizer sold as "Thermolite 31" by M & T Chemicals, Inc. The milled sheets obtained from these blends are compression molded into 1/16" thick plaques and cut into specimens whose flammability rating is evaluated according to ASTM D-635 and whose heat distortion temperature, in terms of their deflection temperature under load (DTL), is evaluated according to ASTM D-648. The results of these tests are set forth in the following table:

| Thermoplastic polymer substrate | Composition of polyblend | DTL (° F.) | Flammability rating |
|---|---|---|---|
| ABS Resin | 100% ABS | 184 | Burning. |
| Do | 50%ABS plus5 0% C-VC/BB[1] | 173 | Non-burning. |
| Do | 50%ABS plus 50% VC/BB[2] | 151 | Burning. |
| Polymethyl methacrylate | 100% PMMA | 190 | Burning. |
| Do | 50% PMMA plus 50% C-VC/BB | 176 | Non-burning. |
| Do | 50% PMMA plus 50% VC/BB | 161 | Self-extinguishing. |

[1] C-VC/BB=The post-chlorinated vinyl chloride:bis(beta-chloroethyl) vinylphosphonate copolymer whose preparation is described hereinabove.
[2] VC/BB=The 75:25 vinyl chloride:bis(beta-chloroethyl)vinylphosphonate copolymer used to prepare the above described post-chlorinated copolymer.

EXAMPLE IV

This example illustrates the preparation of additional specimens of the post-chlorinated copolymers of this invention.

Utilizing the general procedures described in Examples I and III, additional vinyl chloride:bis(beta-chloroethyl) vinylphosphonate copolymers are chlorinated utilizing the specific reaction conditions set forth in the following table. In each case, 200 gms. of copolymer are reacted for 4 hours at 40° C. at a chlorine flow rate of 3 cc./min./gm. of copolymer. The analysis of the resulting post-chlorinated products as well as of the copolymers used in their preparation is also given in this table.

| | | | Analysis of— | | | |
|---|---|---|---|---|---|---|
| | | | Unchlorinated copolymer | | Chlorinated copolymer | |
| Composition of copolymer, VC/BB | Conc. of swelling agent (ml.) | Yield (g.) | Percent Cl | Percent P | Percent Cl | Percent P |
| 70/30 | 65 | 240 | 48.2 | 4.27 | 56.8 | 3.35 |
| 60/40 | 40 | 230 | 45.3 | 4.83 | 53.8 | 4.4 |
| 50/50 | 20 | 215 | 43.6 | 6.53 | 48.9 | 6.02 |

Variations may be made in proportions, procedures and materials without departing from the scope of this invention as defined in the following claims.

What is claimed is:

1. A fire retardant polyblend comprising an intimate admixture of at least one thermoplastic polymer and from about 5–50% by weight based on the weight of the blend of at least one post-chlorinated copolymer of: (1) at least one vinyl halide and (2) at least one bis(hydrocarbyl) vinylphosphonate having the structure:

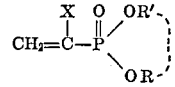

wherein X is selected from the group consisting of hydrogen, halogen, cyano, aryl and haloaryl, $C_1$–$C_{18}$ alkyl and haloalkyl, and

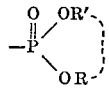

wherein R and R' are hydrocarbyl and substituted hydrocarbyl groups which can be the same, different or conjoint, said post-chlorinated copolymer having a chlorine content in the range of from about 35 to 75 percent by weight.

2. The polyblend of claim 1, wherein in said post-chlorinated copolymer said bis(hydrocarbyl) vinylphosphonate is bis(beta-chloroethyl) vinylphosphonate.

3. The polyblend of claim 1, wherein in said post-chlorinated copolymer said vinyl halide is selected from the group consisting of vinyl chloride, vinyl bromide and vinyl fluoride.

4. The polyblend of claim 3, wherein in said post-chlorinated copolymer said vinyl halide is vinyl chloride.

5. The polyblend of claim 1, wherein in said post-chlorinated copolymer said vinyl halide is present in a concentration of from about 5 to 95%, by weight.

6. The polyblend of claim 1, wherein in said post-chlorinated copolymer at least one optional ethylenically unsaturated comonomer is also present in a concentration of up to about 50%, by weight.

7. The polyblend of claim 1, wherein said post-chlorinated copolymer has a $T_g$ in the range of from about −10 to 150° C.

8. The polyblend of claim 1, wherein said post-chlorinated copolymer is prepared by reacting gaseous chlorine and a vinyl halide:bis(hydrocarbyl) vinylphosphonate copolymer, said reaction being carried out while said copolymer is being exposed to ultraviolet radiation.

9. The polyblend of claim 1, wherein said thermoplastic polymer is selected from the group consisting of polymethyl methacrylate and the copolymers of methyl methacrylate with a minor proportion of at least one other ethylenically unsaturated monomer; acrylonitrile-butadiene-styrene resins; a polymer of styrene selected from the group consisting of polystyrene, poly(alpha-methyl styrene) and poly(tertiary butyl styrene) and copolymers of styrene, alphamethyl styrene or tertiary butyl styrene with a minor portion of at least one other ethylenically unsaturated monomer; polyamide resins; polyester resins; polyurethane resins; polycarbonate resins; polyacetal resins; polysulfone resins; acrylate:styrene:acrylonitrile resins; methacrylate-butadiene-styrene resins; polyphenylene oxide resins; polymethacrylonitrile or polyacrylonitrile and the copolymers of methacrylonitrile or acrylonitrile with a minor proportion of at least one other ethylenically unsaturated monomer; and, polyvinyl chloride and copolymers of vinyl chloride with a minor portion of at least one other ethylenically unsaturated monomer.

10. A fire retardant polyblend comprising an intimate mixture of at least one thermoplastic polymer and from about 5–50% by weight based on the weight of the blend of a post-chlorinated vinyl chloride:bis(beta-chloroethyl) vinylphosphonate copolymer, said post chlorinated copolymer having a chlorine content in the range of from about 35 to 75 percent, by weight.

11. The polyblend of claim 10, wherein in said post-chlorinated copolymer said vinyl chloride is present in a concentration of from about 5 to 95%, by weight, and said bis(beta-chloroethyl) vinylphosphonate is present in a concentration of from about 5 to 95%, by weight.

12. The polyblend of claim 10, wherein said post-chlorinated copolymer has a $T_g$ of from about −10 to 150° C. and a chlorine content of from about 35 to 75%, by weight.

13. The polyblend of claim 10, wherein said thermoplastic polymer is selected from the group consisting of polymethyl methacrylate and the copolymers of methyl methacrylate with a minor proportion of at least one other ethylenically unsaturated monomer; acrylonitrile-butadiene-styrene resins; a polymer of styrene selected from the group consisting of polystyrene, poly(alpha-methyl styrene) and poly(tertiary butyl styrene) and copolymers of styrene, alpha-methyl styrene or tertiary butyl styrene with a minor portion of at least one ethylenically unsaturated monomer; cellulosic resins; poly(alpha-olefins) and the copolymers of the alpha-olefins with a minor proportion of at least one other ethylenically unsaturated monomer; polyamide resins; polyester resins; polyurethane resins; polycarbonate resins; polyacetal resins; polysulfone resins; acrylate:styrene:acrylonitrile resins; methacrylate-butadiene-styrene resins; polyphenylene oxide resins; and polymethacrylonitrile or polyacrylonitrile and the copolymers of methacrylonitrile or acrylonitrile with a minor proportion of at least one other ethylenically unsaturated monomer; and, polyvinyl chloride and copolymers of vinyl chloride with a minor portion of at least one other ethylenically unsaturated monomer.

References Cited
UNITED STATES PATENTS

| | | | |
|---|---|---|---|
| 3,062,792 | 11/1962 | McConnell et al. | 260—80.71 |
| 3,489,706 | 1/1970 | Mikofalvy | 260—80.71 |
| 3,551,400 | 12/1970 | Yonezu et al. | 260—92.8 A |

PAUL LIEBERMAN, Primary Examiner

U.S. Cl. X.R.

204—159.17, 159.18; 260—17 R, 17.4 R, 17.4 ST, 29.6 T, 29.6 TA, 30.8 DS, 33.8 UA 78.5 BB, 78.5 CL, 78.5 T, 80.72, 80.8, 80.81, 87.5 R, 87.7, 92.8 AC, 859 R, 873, 876 R, 890, 891, 874, 898, 899, 900